United States Patent [19]
Gini et al.

[11] Patent Number: 4,832,589
[45] Date of Patent: May 23, 1989

[54] HEAD FOR THE CIRCULAR COEXTRUSION OF A PLURALITY OF THERMO-PLASTIC MATERIAL LAYERS

[75] Inventors: Claudio Gini, Oleggio; Giuseppe Vanetti, Castelletoo Sopra Ticino, both of Italy

[73] Assignee: Officina Meccanica G. Prandi & C.S.p.a., Italy

[21] Appl. No.: 47,520

[22] Filed: May 6, 1987

Related U.S. Application Data

[63] Continuation-in-part of Ser. No. 749,198, Jun. 26, 1985, abandoned.

[30] Foreign Application Priority Data

Nov. 28, 1984 [IT] Italy ................................ 23774 A/84

[51] Int. Cl.$^4$ ............................................ B29C 47/26
[52] U.S. Cl. ................................. 425/133.1; 264/173; 425/192 R; 425/379.1; 425/380; 425/462
[58] Field of Search ...................... 425/113, 114, 131.1, 425/133.1, 133.5, 190, 192 R, 376 R, 376 A, 378 R, 379 R, 380, 381, 461, 462, 466, 467, 376.1, 378.1, 379.1, 382.4; 264/171, 173, 209.1, 209.8, 514, 515

[56] References Cited

U.S. PATENT DOCUMENTS

| | | | |
|---|---|---|---|
| 3,308,508 | 3/1967 | Schrenk | 425/133.1 |
| 3,327,349 | 6/1967 | Lennox | 425/133.1 |
| 3,365,750 | 1/1968 | Donald | 425/133.1 |
| 4,047,868 | 9/1977 | Kudo et al. | 425/133.1 |
| 4,249,875 | 2/1981 | Hart et al. | 425/133.1 |
| 4,280,801 | 7/1981 | Wheeler, Jr. et al. | 425/113 |
| 4,285,656 | 8/1981 | Herrington | 425/462 |
| 4,472,129 | 9/1984 | Siard | 425/376 A |
| 4,522,775 | 6/1985 | Briggs et al. | 425/133.1 |

FOREIGN PATENT DOCUMENTS 1082043 5/1960 Fed. Rep. of Germany ... 425/133.1

Primary Examiner—Jan H. Silbaugh
Assistant Examiner—Jill L. Heitbrink
Attorney, Agent, or Firm—Ostrolenk, Faber, Gerb & Soffen

[57] ABSTRACT

A head for the coextrusion of a plurality of N thermoplastic materials, N representing a positive integer, consisting of N+1 thermally insulated plates which are substantially modular and fit together and are aligned by respective projections and recesses on each plate, each plate having a conduit to feed a thermoplastic material, one half of a collector-distributor cavity on one face for collecting and distributing the material, and one half of a channel on the same face which extends radially from the collector-distributor to a narrow annular space created by the separation between a central male inner body and the concentric inner surface of each plate. The intermediate plates between the end plates each also have on their second face a second half of a collector-distributor cavity and a second half of a channel which, by respective coupling with opposite halves of a collector-distributor cavity and opposite halves of a channel on the opposite face of an adjacent plate form a complete collector-distributor cavity and a complete channel which extend annularly over the entire plate, the radial position and width of the collector-distributor cavity and the channel being circumferentially eccentric with respect to the center of the head. The collector-distributor cavity is pear-shaped to impart a uniform velocity to the molten thermoplastic material and to avoid the formation of a flow junction which creates a weakness in the thin-film extruded product.

2 Claims, 3 Drawing Sheets

HEAD FOR THE CIRCULAR COEXTRUSION OF A PLURALITY OF THERMO-PLASTIC MATERIAL LAYERS

RELATED APPLICATIONS

This application is a continuation-in-part of Ser. No. 749,198, filed June 26, 1985, now abandoned, which is herein incorporated by reference.

BACKGROUND OF THE INVENTION

1. Field of the Invention

The present invention relates to a head for the circular extrusion of concentric layers of thermoplastic materials (whether different or not), particularly for the extrusion of tubular multi-layer films.

2. Description of the Prior Art

It is known that the use of films or sheets consisting of multiple layers and prepared by the tubular coextrusion technique is largely increasing. It is also known that the heart of the coextrusion technique is the head, many types of which are known, each having certain advantages and drawbacks. The simplest type of head consists conventionally of an inner cylindrical male body which is surrounded by a plurality of outer rings kept together be means of radial screws on a support body.

The inner male body and outer rings are concentric and the outer surface of the male body is slightly separated from the ring inner surface, whereby an annular passage is thus brought about, which imparts initial diameters and thicknesses to the tubular layers of the different materials under extrusion. The concentric pieces forming the annular passages, however, raise several problems of design, working, assembly and seal. Since the number of feeding channels is equal to the number of thermoplastic materials to be extruded, each piece requires a specific design. This raises serious constructive problems in that delicate work must be performed on machine tools in order to achieve the specific tolerances required for the different plates and channels. Further difficulties occur during the head assembly and disassembly, for example, in the cleaning of the various channels. Also, when it is desired to increase the number of tube forming layers, it is necessary to increase the number of concentric channels and thus the head outer diameter, which creates problems of cumber and operation since the heating elements for the head are located on its exterior. Thus, a good temperature control can be obtained on the outer portion of the head but not on the inner zones of the head. Further, control of the different layers thicknesses depends on the tolerances of the various channels located at the different circumferences within the annular body of the head, making it necessary to control thickness with a single adjustment with doubtful results and further constructive complications.

Several solutions have been proposed to eliminate or at least reduce these drawbacks. However, no definitive success has to date been reached. Applicant has already developed certain commercial solutions (although with some limitations).

One prior art die, covered by U.S. Pat. No. 4,280,801 to Wheeler, Jr. et al., issued July 28, 1981, includes a plurality of "bottle-shaped" cavities and distribution cavities which extend around the central axis of the die, each corresponding to one of a plurality of thermoplastic layers to be extruded onto a wire passing through the center of the die. The cavities and distribution passages diminish in length uniformly from both sides of the inlet passageway along their circumference to a point farthest from the inlet passageway, i.e., 180° from the inlet passageway, at which point the bottle shaped cavity disappears entirely.

As shown in FIG. 4A, of the present application the bottle-shaped cavity of the Wheeler, Jr. et al. die has four zones (1-4) in which the molten thermoplastic material has a very low velocity, creating high speed gradients in central zones (5-6) where the velocity of the thermoplastic material is relatively high. Thus, not only are zones 1-4 unuseful as "dead zones", but they create undesirable turbulence and thus unevenness in material flow.

SUMMARY OF THE INVENTION

By continuing research and study in this important field, applicant has now succeeded in developing a coextrusion head which substantially avoids the drawbacks of prior art devices, and achieves, as a first object, a very simple design, rheology, and machine tool working, and which provides an optimal distribution of the extrusion layers without requiring additional controls and which achieves, as a second object, a head structure formed of elements which are substantially repetitive and modular, and which allow very easy assembly and disassembly, resulting in remarkable cost reductions.

These and other objects are achieved in accordance with the invention with a head for the coextrusion of a plurality of N thermoplastic resins, N representing a positive integer, in the form of N superposed tubes, the head consisting of a central male inner body whose outer cylindrical surface is surrounded by and spaced a short distance from the concentric inner cylindrical surface to create a narrow annular space for forming a primary composite tube. The inner cylindrical surface is made of a plurality of N+1 plates which are modular and fit together and are aligned by respective projections and recesses in each plate. Each plate has a conduit for feeding one of the N thermoplastic resins to be extruded, a first half of a collector-distributor cavity which collects and distributes the resin coming from the conduit, and a first half of a channel which extends radially from said first half of the collector-distributor cavity to the narrow annular space formed by the cylindrical plate assembly.

The intermediate plates between the end plates, i.e., plates 2 to N, have a second half of a collector-distributor cavity, a second half of a collector-distributor cavity and a second half of a radial channel, the first half of the collector-distributors cavity and the first half of the channel being on one face of each intermediate plate and the second half of the channel and the second half of the collector-distributor cavity being on the other face of each intermediate plate.

The first half of the collector-distributor cavity and the first half of the channel on the lower face of a plate join with the second half of the collector-distributor cavity and the second half of the channel on the upper face of the adjacent plate respectively, to form a complete collector-distributor cavity and channel, each of which extends annularly entirely around the plate, the cross sectional area and radial position and width of the collector-distributor cavity and the radial position and width of the channel varying around the plate, to thereby cause the pressure of the material under extrusion to be substantially equal as it passes from the collector-distributor cavity through the channel towards the central male body.

Accordingly, substantially equal pressures in the narrow annular space defined by the composite inner plate surface and the central male body outer surface are achieved by imparting, on each plate, a first eccentricity to the two circumferences which form the boundary for the collector-distributor cavity and a second eccentricity (different than the first one) to the circumferences which form the boundary for the channel from the collector-distributor cavity to the composite inner cylindrical surface formed by the plates.

In a further embodiment of the invention, these first and second eccentricities on the adjoining faces of one of the pairs of adjoining plates are offset from the eccentricities on the adjoining faces of all the other pairs of adjoining plates.

The collector-distributor cavities of the present invention are provided with a pear-like shape which eliminates the dead zones and high speed gradients associated with prior art dies, and which maintains a substantially constant velocity flow of thermoplastic material completely around the die, resulting in extruded layers of uniform thickness.

Each plate of the present invention contacts each adjacent plate over only a small annular area with respect to the entire face of each plate. Accordingly, the plates are substantially thermally isolated from one another, thus allowing accurate independent temperature control of each plate by means of a heating element and thermocouple disposed in each plate. This feature allows the invention to be used for extrusion of a variable number N of layers of N thermoplastic materials, each layer N requiring a different plate temperature control.

BRIEF DESCRIPTION OF THE DRAWINGS

These features, as well as others, shall become readily apparent after reading the following description in conjunction with the accompanying drawings in which.

DETAILED DESCRIPTION OF THE PREFERRED EMBODIMENT

Figure 1:
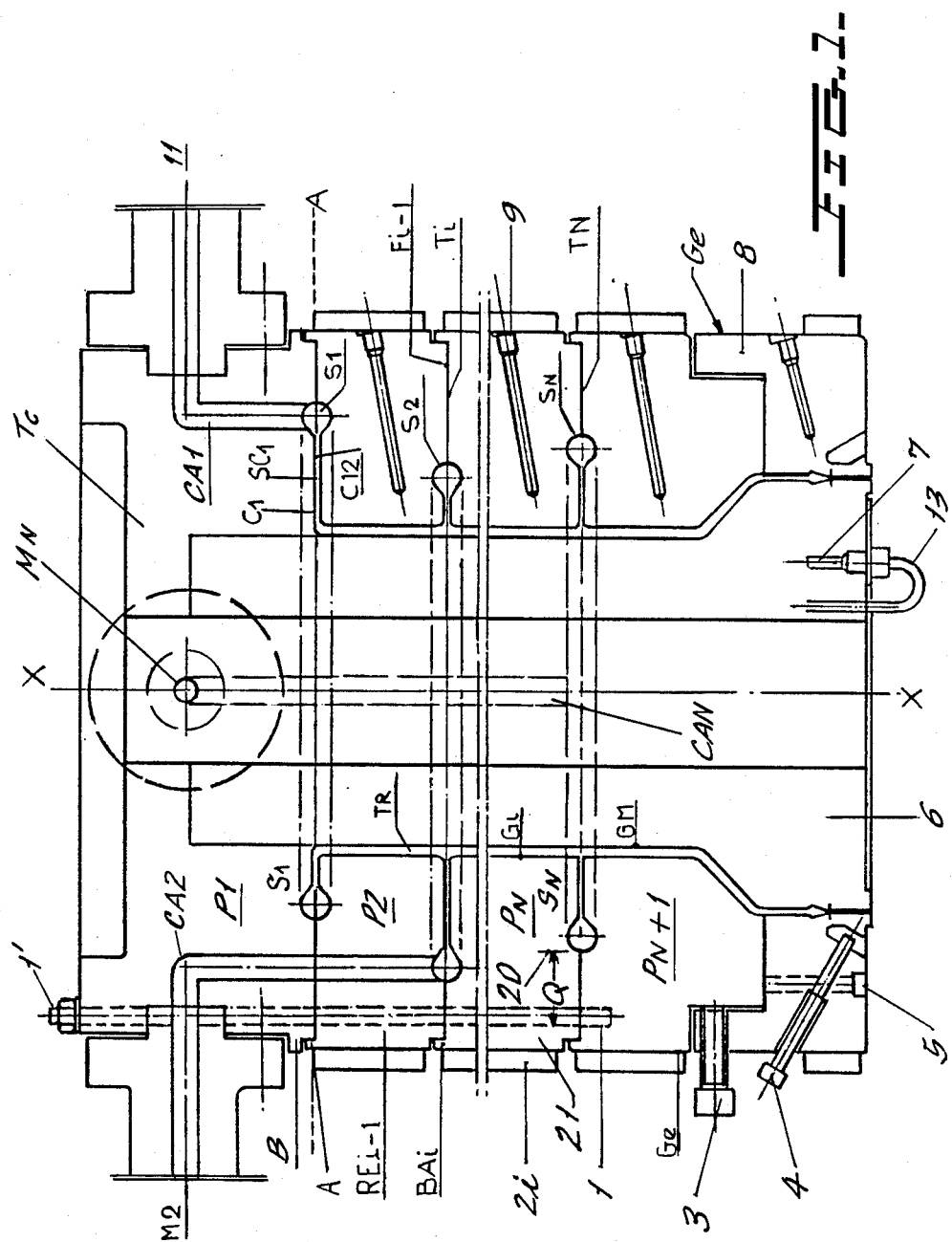
FIG. 1 is a schematic, partially cross-sectional front view of the head according to the invention.

As shown in FIG. 1, the head for coextrusion of N layers or annuli of typically different but possibly also like materials comprises N+1 plates labelled $P_1, P_2, \ldots P_i, \ldots P_N, P_{N+1}$, where "N" refers to a positive integer and "i" refers to a generic repetitive component of the system.

With each plate $P_i$ are associated: a heating element $2_i$, a thermocouple 9 and a feeding conduit $CA_i$ of the material $M_i$ to be extruded. Each conduit $CA_i$ extends parallel to the longitudinal axis X—X of male body 6 and ends in an annular collector-distributor cavity $S_i$ which acts as pipe fitting with a radial channel $C_i$ extending from the collector-distributor cavity $S_i$ to the narrow annular passage or space TR between the outer surface GM of male body 6 and the numerous inner surfaces $G_i$ of the superposed plates.

Each channel $C_i$ is formed of two half channels $SC_{i-1}$ and $SC_i$, one on the lower face or bottom $F_{i-1}$ of plate $P_{i-1}$ and the other on the upper face or top $T_i$ of the successive plate $P_i$. Therefore, all intermediate plates from $P_2$ and $P_N$ each have two half channels (one on the top, one on the bottom), whereas the two external plates $P_{N+1}$ each have only one half channel. More precisely, the first plate $P_1$ has half channel $SC_1$ on its bottom and the last plate $P_{N+1}$ has its half channel $SC_N$ on its top $T_N$. According to an important feature of the invention, the plates, in particular the intermediate plates, are modular and are assembled by form-fit between them. To this end, the top portion of each plate has a projection $BA_i$ which is in register with a recess $RE_{i-1}$ in the preceding plate. Each pair of coupled plates $P_{i-1}$ and $P_1$ have a bottom $F_{i-1}$ and a top $T_i$ in contact along zone Q between the radially remote end 20 of a fitting mouth $S_i$ and the inner end 21 of the area of cooperation between projection $BA_i$ and recess $RE_{i-1}$. Consequently, the lower face of each intermediate pate $P_1$ has, from the outer end $G_e$ to the inner portion TR, a recess $RE_{i-l}$, then contacting zone Q, a half collector-distributor cavity $S_t$ and a half channel $SC_i$. The upper face of each plate $P_i$ has a projection $BA_i$, the contacting zone Q, and half of a collector-distributor cavity (opposite to the one of the lower face) and half of a channel.

The first and last plates have only a single shaped face. As shown in FIG. 1, the first plate $P_1$ has a recess, a half of collector-distributor cavity and a half of a channel on its lower face, while the last plate $P_{N+1}$ has only on its upper face, a projection, the half of a collector-distributor cavity and the half of a channel.

The modular plates, which are assembled by a simple superimposing, are advantageously kept together by fastening means, for example, screws or bolts 1—1'. The coextrusion head ends at its lowest portion with the die or female body 8. At its end, the head is provided with a flexible lip regulating screw 3, a blocking screw 5 and of a male thermocouple 7.

Figure 2:
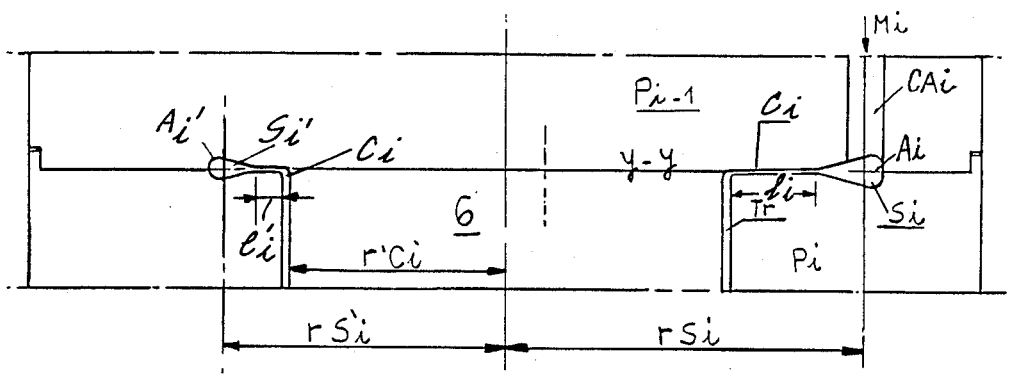
FIG. 2 is also a schematic, partially cross-sectional front view (like that of FIG. 1) of a very limited portion comprising an annular collector-distributor cavity and the corresponding channel.

FIG. 2 shows conduit $CA_i$ which feeds resin $M_i$ and terminates at its bottom in the collector-distributor cavity $S_i$ which feeds the channel $C_i$ which, in turn, feeds resin into passage Tr. The feeding conduit $CA_i$ is parallel to the male longitudinal axis X—X, channel $C_i$ is radial and collector-distributor cavity $S_i$, which connects these two orthogonal feeding line, has a "pear"-like, or more precisely "drop-like", cross-sectional shape, which is described in further detail below. According to an important feature of the invention, the collector-distributor cavity $S_i$ and the relevant channel $C_i$ extend around the entire central axis of the die, but with an eccentricity. As may be seen from FIGS. 1–3 (especially from FIG. 2), channel $C_i$ and collector-distributor cavity $S_i$ are on the same plane Y—Y orthogonal to axis X—X. However, they are not symmetrical to X—X. Collector-distributor cavity $S_i$ and channel $C_i$ are configured (FIG. 2) of an initial portion $CA_i$ and $S_i$ in contact with feeding conduit $M_i$ and, at a radial distance $rS_i$ from axis X—X, of an opposite portion (at 180° around the circumference of the head) $C'_i$ and $S'_i$ having structural characteristics (i.e., area $A'_i$ of $S'_i$, radial length $l'_i$ of $C'_i$, distance $rS'_i$ from axis X—X) different from those of the corresponding portions $A_i$ or $S_i$, $l_i$ of $C_i$, and $rS_i$ associated with resin input $M_i$. The variation in area from $A_i$ to $A'_i$ in the circumferential passage from $S_i$ to $S'_i$, the radial variation from $l_i$ to $C_i$ to $l'_i$ at $C'_i$, as well as the radial variation from $rS_i$ to $rs'_i$, are calculated and designed so as to obtain the same pressure drop circumferentially in the flow of the molten resin from the collector-distributor cavity through the channels to the outer surface GM of male body 6.

Figure 3:
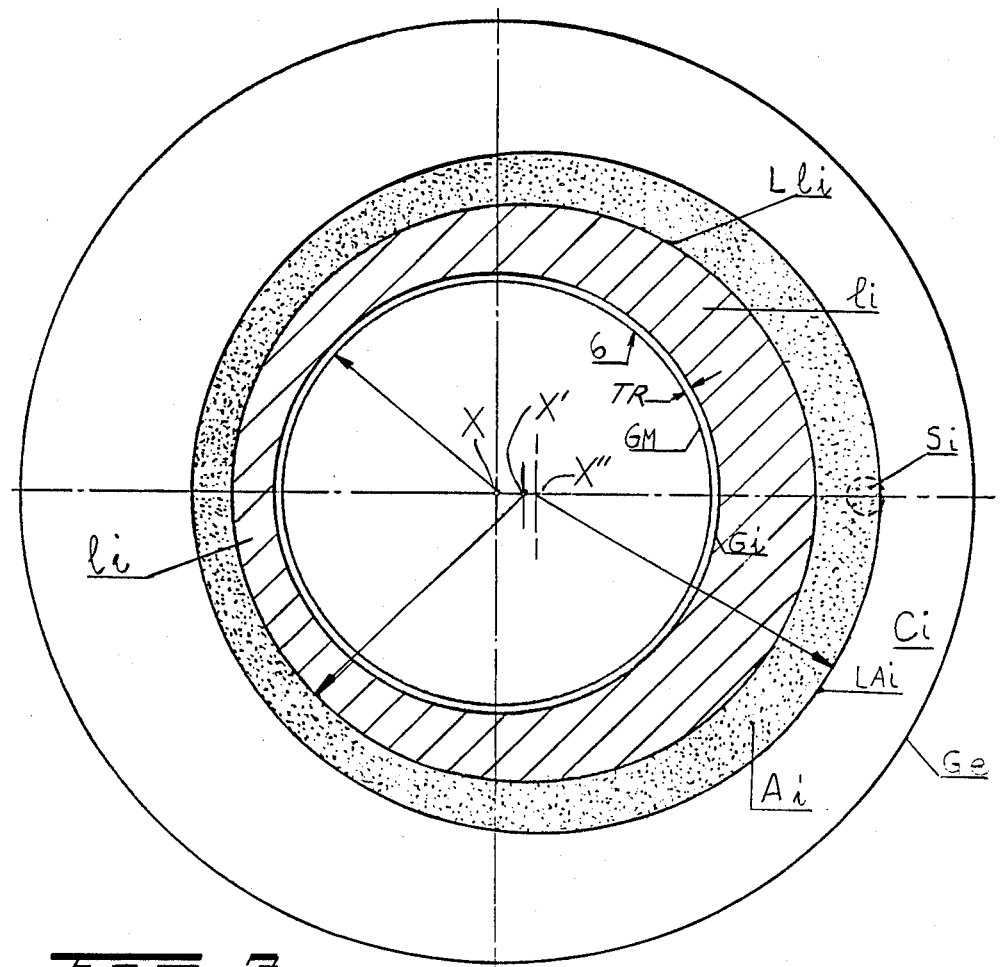
FIG. 3 is a schematic cross-sectional view taken substantially along line A—A of FIG. 1.

FIG. 3, the references indicate respectively:

X is the central trace of axis X—X of the whole head TC;

GM and $G_i$ are outer and inner curves respectively of the male body and of the plate $P_i$ defining the passage TR;

$Ll_i$ is the circumferential locus of the points corresponding to the radial lengths $l_i$ of channels $C_i$;

$LA_i$ is the locus of the points of the outer ends of areas $A_i$ (FIG. 2).

The annular zone between $G_i$ and $Ll_i$ therefore gives the variation of the radial lengths of $C_i$, $G_i$ being a circle with its center at X, and $Ll_i$ being a circle with its center at X', the annular zone thereby having an eccentricity of X—X'. The annular zone between $Ll_i$ and $LA_i$ gives the variation of areas $A_i$, $LA_i$ having an eccentricity X—X" over passage TR and an eccentricity X'—X" over $Ll_i$.

The variable distances between $G_i$ and $Ll_i$ correspond to the variations of $l_i$; the distances between $LA_i$ and $Ll_i$ correspond to the variation of the cross-sectional area of $S_i$.

Figure 4A:
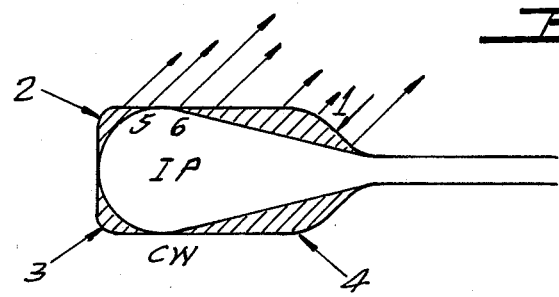
FIGS. 4A and 4B are schematic cross-sectional views of a bottle-shaped cavity of the prior art and the pear-shaped collector-distributor cavity of the present invention, respectively, showing the velocity vectors in each.
Figure 4B:
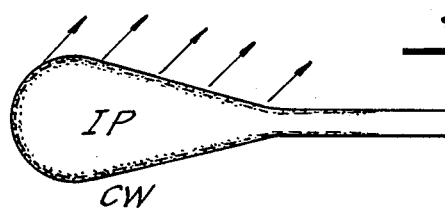

FIG. 4B shows a cross-sectional side view of the collector-distributor cavity formed by the joinder of each pair of adjacent plates. The pear-like, or more accurately drop-like, shape of the cavity substantially eliminates the dead zones formed by the bottle-shape of prior art cavities, shown in FIG. 4A and discussed above, thus imparting a uniform velocity to the molten thermoplastic material in both the circular and radial directions.

Although the molten thermoplastic material contacts the cavity wall CW and thus has a lower velocity at the sides than in the inner portion IP, this difference in velocity is:

(1) very small;
(2) constant; and
(3) has no gradients within it.

Thus, the velocity vector along the cavity wall CW is constant, although slightly lower than the velocity vector in the inner zone IP which is, in turn constant throughout zone IP.

Significantly, the pear shape of the collector-distributor cavity of the present invention is maintained entirely around the die. In the prior art die of Wheeler, Jr. et al., FIG. 10, the cavity entirely disappears at the point 180° from the inlet, resulting in the formation of a junction 60 as the flow of one head (A) meets the flow of second head (A'). Junction 60 forms a line of weakness, which is evident in the extruded material. This head-to-head junction poses no problem in the formation of cable insulation (as in Wheeler, Jr. et al.) because of the thickness of the extruded layer, but is significant in formation of very thin films as in the present invention. Indeed, in the coextrusion of very thin multi-layer films, any junction must be avoided because such films are often stretched after formation and would be prone to break along the line of weakness formed by the junction.

Figure 5A:
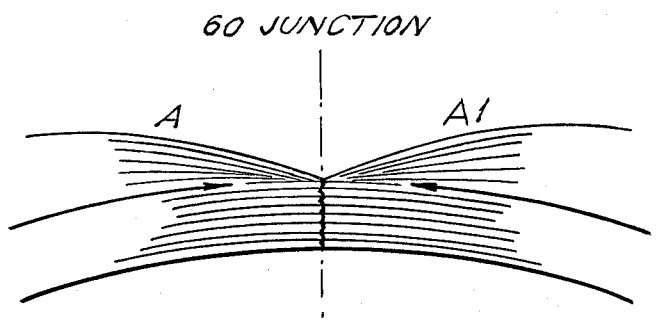
FIGS. 5A and 5B show respectively, the intersection of the thermoplastic material flow in a prior art die and a die constructed in accordance with the present invention.
Figure 5B:
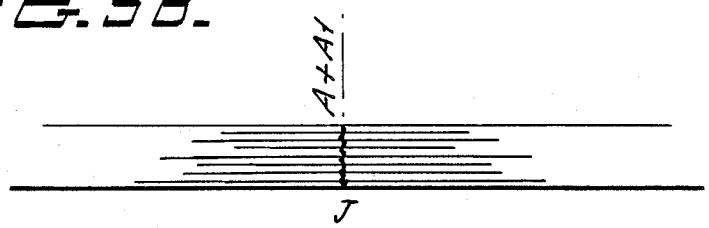

The continuous pear-shaped cavity of the present invention advantageously avoids the formation of this head-to-head junction, i.e., there is no breakpoint or line in the flows. Rather, as shown in FIG. 5B, in the present invention, the flows merge in the pear-shaped cavity $A'_i$ and in the passage $l'_i$.

In the structure of the present invention, the plates $P_i$ are substantially separated; i.e., adjacent plates contact each other on only a small annular surface relative to the total face surface area of each plate. Accordingly, by minimizing the area of contact, the plates $P_i$ are substantially thermally insulated from one another. This thermal insulation is important because each plate can thus be accurately and precisely temperature controlled by means of heating element $2_i$ associated with each plate. Such temperature control would be difficult if each plate were not substantially isolated from adjacent plates.

The capability to regulate each plate's temperature independently is advantageous in that the temperature of each plate must be adjusted whenever the number of layers to be extruded changes, i.e., when a change is made, for example, from a two layer film to a four layer film. The flexibility of the present invention to extrude N layers using N polymers is achieved through this unique capability to individually control plate temperature.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. A die for the coextrusion of a plurality of N thermoplastic resins, to form N superimposed highly uniform tubes, N representing a positive integer, said die comprising:

a central male inner body whose outer cylindrical surface is surrounded by and spaced a short distance from a concentric inner cylindrical surface to create a narrow circular annular space for forming said N superimposed tubes, said inner cylindrical surface comprising a wall formed by a plurality of circular N+1 plates which are modular and fit together and are aligned with each other along a central axis of said die by respective projections and recesses in each plate, adjacent plates contacting each other over a relatively small annular area as compared to the total surface area of the face of each plate, so that the plates are thermally isolated from one another and may be temperature controlled independently by means of a heating element disposed in each plate;

each plate 1 to N having a conduit for feeding one of the N thermoplastic resins to be extruded, a first half of pear-shaped collector-distributor cavity which collects and distributes the resin coming from said conduit with a uniform velocity, and a first half of a channel which extends radially from said first half of said collector-distributor cavity to the narrow annular space;

end plate N+1 and each intermediate plate from 2 to N between end plates 1 and N+1 further having a second half of said collector-distributor cavity and a second half of said radial channel, the first half of said collector-distributor cavity and the first half of said channel being on one face of each intermediate plate and the second half of said collector-distributor cavity and the second half of said channel being on the opposite face of each intermediate plate;

the first half of said collector-distributor cavity and the first half of said channel on one face of each plate join with the second half of said collector-distributor cavity and the second half of said channel on the other face of an adjacent plate to form a complete collector-distributor cavity and channel, each of which extends annularly in each plate entirely around said central axis, wherein the radial position and radial length of the collector-distributor cavity and channel formed by each pair of adjacent plates varies eccentrically with respect to said central axis, said radial position and radial length of the collector-distributor cavity and channel continuously decreasing around said central axis along its circumference in accordance with the circumferential distance of said collector-distributor cavity and channel from said conduit feeding the thermoplastic resin, to thereby cause the pressure drop of the material under extrusion to be substantially equal as it passes from the collector-distributor cavity through the channel formed by each pair of adjacent plates toward the annular space.

2. An extrusion die as recited in claim 1, wherein the eccentricity of the radial position and radial length of the collector-distributor cavity and channel formed by a pair of adjacent plates is offset from the eccentricity of the radial position and radial length of the collector-distributor cavity and channel formed by every other pair of adjacent plates.

* * * * *